(12) United States Patent
Suzuki et al.

(10) Patent No.: US 9,099,244 B2
(45) Date of Patent: Aug. 4, 2015

(54) MULTILAYER CERAMIC CAPACITOR AND METHOD FOR MANUFACTURING MULTILAYER CERAMIC CAPACITOR

(71) Applicant: Murata Manufactoring Co., Ltd., Nagaokakyo-shi, Kyoto-fu (JP)

(72) Inventors: Shoichiro Suzuki, Nagaokakyo (JP); Shinichi Yamaguchi, Nagaokakyo (JP)

(73) Assignee: Murata Manufacturing Co., Ltd., Kyoto (JP)

(*) Notice: Subject to any disclaimer, the term of this patent is extended or adjusted under 35 U.S.C. 154(b) by 180 days.

(21) Appl. No.: 13/963,086

(22) Filed: Aug. 9, 2013

(65) Prior Publication Data

US 2013/0321980 A1    Dec. 5, 2013

Related U.S. Application Data

(63) Continuation of application No. PCT/JP2012/053233, filed on Feb. 13, 2012.

(30) Foreign Application Priority Data

Feb. 14, 2011    (JP) .................................. 2011-028981

(51) Int. Cl.
  *H01G 4/008*    (2006.01)
  *H01G 4/30*    (2006.01)
  *H01G 4/12*    (2006.01)

(52) U.S. Cl.
  CPC .............. *H01G 4/008* (2013.01); *H01G 4/1209* (2013.01); *H01G 4/1227* (2013.01); *H01G 4/1245* (2013.01); *H01G 4/30* (2013.01); *Y10T 29/435* (2015.01)

(58) Field of Classification Search
  USPC ................ 361/305, 303, 301.2, 301.4, 306.1, 361/306.3, 311–313, 321.1, 321.2; 501/134–139
  See application file for complete search history.

(56) References Cited

U.S. PATENT DOCUMENTS

| 6,291,380 | B1 * | 9/2001 | Yokoi et al. ................... 501/138 |
| 6,917,513 | B1 | 7/2005 | Kim et al. |
| 7,277,268 | B2 * | 10/2007 | Celik et al. ..................... 361/305 |
| 7,751,175 | B2 * | 7/2010 | Nagamoto et al. ......... 361/306.3 |
| 7,936,554 | B2 * | 5/2011 | Itamura et al. ................ 361/303 |
| 8,035,950 | B2 * | 10/2011 | Kusano et al. ............. 361/306.3 |

(Continued)

FOREIGN PATENT DOCUMENTS

| JP | 59-54672 A | 3/1984 |
| JP | 04-110978 A | 4/1992 |

(Continued)

OTHER PUBLICATIONS

Official Communication issued in corresponding Japanese Patent Application No. 2013-241458, mailed on Aug. 26, 2014.

(Continued)

*Primary Examiner* — Nguyen T Ha
(74) *Attorney, Agent, or Firm* — Keating & Bennett, LLP (57) ABSTRACT

A multilayer ceramic capacitor includes a multilayer body including a plurality of laminated dielectric layers and a plurality of internal electrodes arranged along interfaces between the dielectric layers, and a plurality of external electrodes located on an outer surface of the multilayer body and electrically connected to the internal electrodes. A main component of the internal electrodes is Ni, and the internal electrodes also contain Sn.

20 Claims, 5 Drawing Sheets

(56) References Cited

U.S. PATENT DOCUMENTS

| | | | |
|---|---|---|---|
| 8,264,817 B2 * | 9/2012 | Nakamura et al. | ......... 361/321.4 |
| 2004/0145856 A1 | 7/2004 | Nakamura et al. | |
| 2004/0256603 A1 | 12/2004 | Celik et al. | |
| 2011/0110014 A1 | 5/2011 | Hirata et al. | |

FOREIGN PATENT DOCUMENTS

| | | | |
|---|---|---|---|
| JP | 5-290622 A | 11/1993 | |
| JP | 10-330161 A | 12/1998 | |
| JP | 11-283867 A | 10/1999 | |
| JP | 2000-124058 A | 4/2000 | |
| JP | 2000-348962 A | 12/2000 | |
| JP | 2005-505695 A | 2/2005 | |
| JP | 2005-298315 A | 10/2005 | |
| WO | 2010/146967 A1 | 12/2010 | |

OTHER PUBLICATIONS

Official Communication issued in International Patent Application No. PCT/JP2012/053233, mailed on May 15, 2012.

\* cited by examiner

WT CROSS SECTION OF CHIP, AND LOCATIONS ANALYZED BY WDX

DEPENDENCY OF MTTF WITH RESPECT TO
THICKNESS OF DIELECTRIC LAYER

MULTILAYER CERAMIC CAPACITOR AND METHOD FOR MANUFACTURING MULTILAYER CERAMIC CAPACITOR

BACKGROUND OF THE INVENTION

1. Field of the Invention

The present invention relates to a multilayer ceramic capacitor, and a method for manufacturing a multilayer ceramic capacitor.

2. Description of the Related Art

With the progress of electronics technology in recent years, miniaturization and capacity enlargement in a multilayer ceramic capacitor have been demanded. To meet these requirements, thinning of a dielectric layer in a multilayer ceramic capacitor has been promoted. However, thinning of a dielectric layer causes a field intensity applied to each layer to be relatively high. Therefore, improvement in reliability during application of a voltage is required.

Generally, a multilayer ceramic capacitor includes a multilayer body including a plurality of laminated dielectric layers and a plurality of internal electrodes formed along interfaces between the dielectric layers; and a plurality of external electrodes formed on an outer surface of the multilayer body and electrically connected to the internal electrodes. For example, as shown in Japanese Patent Publication No. 11-283867, there has been known a multilayer ceramic capacitor employing Ni as a main component of an internal electrode.

There has been a problem that reliability during application of a voltage is still not sufficient to meet the demand for miniaturization and capacity enlargement when Ni is employed as a main component of an internal electrode.

SUMMARY OF THE INVENTION

In view of the problem described above, preferred embodiments of the present invention provide a multilayer ceramic capacitor exhibiting favorable dielectric characteristics and superior reliability even with a thinner dielectric layer and application of a voltage having a high electric field intensity.

A multilayer ceramic capacitor according to a preferred embodiment of the present invention includes a multilayer body including a plurality of laminated dielectric layers and a plurality of internal electrodes arranged along interfaces between the dielectric layers; and a plurality of external electrodes located on an outer surface of the multilayer body and electrically connected to the internal electrodes. A thickness of each of the dielectric layers preferably is preferably less than or equal to about 2.5 μm, and the internal electrode contains Ni as a main component, and the internal electrode also contains Sn, and a molar ratio of Sn with respect to a sum of Ni and Sn in each of the internal electrodes preferably is greater than or equal to about 0.001 and less than or equal to about 0.1, for example.

According to the multilayer ceramic capacitor of a preferred embodiment of the present invention, the dielectric layer preferably includes, as a main component, a perovskite-type compound containing Ba and Ti, where a portion of Ba can be replaced with Ca, and a portion of Ti can be replaced with Zr.

A method for manufacturing a multilayer ceramic capacitor according to a preferred embodiment of the present invention includes the steps of preparing a main component powder including a perovskite-type compound as a main component; preparing at least one Sn material selected from the group consisting of an Sn metal, an alloy containing Sn, and an Sn compound; obtaining a ceramic green sheet including the prepared main component powder and the prepared Sn material; obtaining an unfired multilayer body by laminating the ceramic green sheet and internal electrode layers; and obtaining a multilayer body by firing the unfired multilayer body. The multilayer ceramic capacitor includes a plurality of dielectric layers and a plurality of internal electrodes arranged along interfaces between the dielectric layers. Each of the internal electrodes contains Ni as a main component, and also contains Sn, and a molar ratio of Sn with respect to a sum of Ni and Sn in each of the internal electrodes preferably is greater than or equal to about 0.001 and less than or equal to about 0.1, for example.

A method for manufacturing a multilayer ceramic capacitor according to another preferred embodiment of the present invention includes the steps of preparing an internal electrode main component powder including, as a main component, Ni metal or an alloy containing Ni; preparing at least one Sn material selected from the group consisting of an Sn metal, an alloy containing Sn, and an Sn compound; obtaining a ceramic green sheet including main component powder including a perovskite-type compound as a main component; obtaining an unfired multilayer body by laminating the ceramic green sheet and an internal electrode layer including the prepared internal electrode main component powder and the prepared Sn material; and obtaining a multilayer body by firing the unfired multilayer body. The multilayer ceramic capacitor includes a plurality of dielectric layers and a plurality of internal electrodes formed along interfaces between the dielectric layers. Each of the internal electrodes contains Ni as a main component, and also contains Sn, and a molar ratio of Sn with respect to a sum of Ni and Sn in each of the internal electrodes preferably is greater than or equal to about 0.001 and less than or equal to about 0.1, for example.

A method for manufacturing a multilayer ceramic capacitor according to yet another preferred embodiment of the present invention includes the steps of preparing an internal electrode main component powder including Ni—Sn alloy as a main component; obtaining a ceramic green sheet including main component powder including a perovskite-type compound as a main component; obtaining an unfired multilayer body by laminating the ceramic green sheet and an internal electrode layer containing the prepared internal electrode main component powder; and obtaining a multilayer body by firing the unfired multilayer body. The multilayer ceramic capacitor includes a plurality of dielectric layers and a plurality of internal electrodes formed along interface between the dielectric layers. Each of the internal electrodes contains Ni as a main component, and also contains Sn, and a molar ratio of Sn with respect to a sum of Ni and Sn in each of the internal electrodes preferably is greater than or equal to about 0.001 and less than or equal to about 0.1, for example.

According to various preferred embodiments of the present invention, each of a plurality of internal electrodes includes Ni as a main component and also includes Sn, so that a multilayer ceramic capacitor superior in reliability during application of a voltage is provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described.

Figure 1:
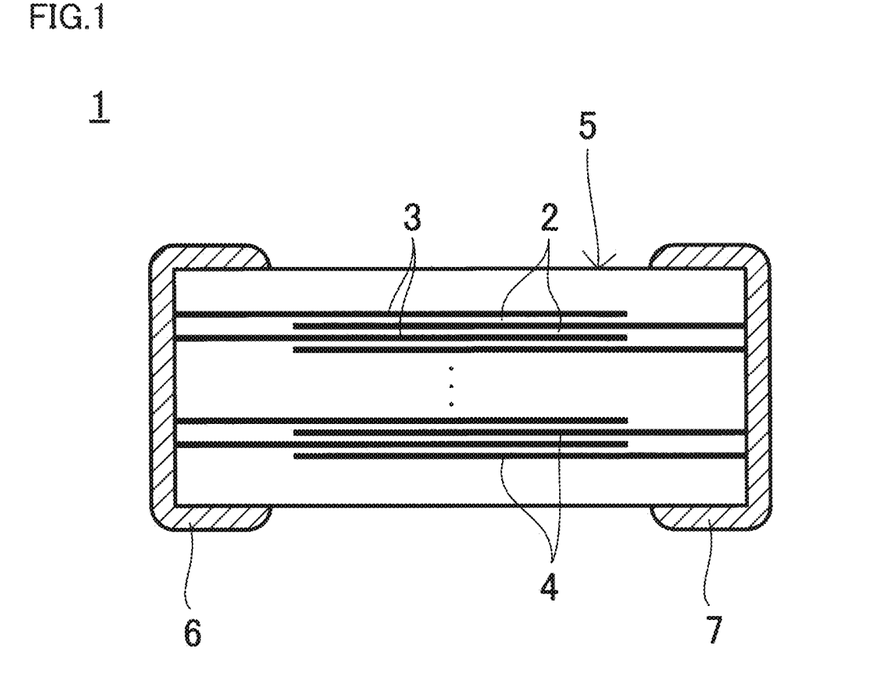
FIG. 1 is a cross sectional view of a multilayer ceramic capacitor according to a preferred embodiment of the present invention.

FIG. 1 is a cross sectional view of a multilayer ceramic capacitor according to a preferred embodiment of the present invention.

A multilayer ceramic capacitor 1 includes a multilayer body 5. Multilayer body 5 includes a plurality of laminated dielectric layers 2, and a plurality of internal electrodes 3 and 4 arranged along interfaces between the plurality of laminated dielectric layers 2. Internal electrodes 3 and 4 may be made of a material including, for example, Ni as a main component.

At different positions on an outer surface of multilayer body 5, external electrodes 6 and 7 are provided. External electrodes 6 and 7 may be made of a material containing, for example, Ag and Cu as main components. In the multilayer ceramic capacitor shown in FIG. 1, external electrodes 6 and 7 are provided on opposite end surfaces of multilayer body 5. Internal electrodes 3 and 4 are electrically connected to external electrodes 6 and 7, respectively. Internal electrodes 3 and 4 are laminated alternately through dielectric layers 2 in multilayer body 5.

Multilayer ceramic capacitor 1 may be a two-terminal type including two external electrodes 6 and 7 or may be a multi-terminal type including a plurality of external electrodes.

According to a preferred embodiment of the present invention, a main component of internal electrodes 3 and 4 is Ni, and internal electrodes 3 and 4 also contain Sn. In this case, a multilayer ceramic capacitor superior in reliability during application of a voltage can be obtained. The form of Sn present in the internal electrodes 3 and 4 is not limited. Sn is preferably present in the form of an alloy containing Sn and Ni, and more preferably in the form of an intermetallic compound of Sn and Ni. In this case, the insulation property of interfaces between dielectric layer 2 and internal electrodes 3 and 4 is improved, so as to further enhance the reliability during application of a voltage.

The way of providing Sn is not particularly limited. For example, Sn may be contained in advance in conductive paste constituting internal electrodes 3 and 4, or may be mixed into material powder of a dielectric ceramic constituting dielectric layer 2 after firing. In the latter case, when SnO powder is mixed into material powder of a dielectric ceramic, and thereafter fired at a temperature rise rate greater than or equal to about 20° C./min in a reducing atmosphere, SnO is reduced to Sn so as to be readily absorbed by internal electrodes 3 and 4.

A molar ratio of Sn with respect to a sum of Ni and Sn in internal electrodes 3 and 4 is preferably greater than or equal to about 0.001 and less than or equal to about 0.1, for example.

When Sn is greater than or equal to about 0.001, an effect of containing Sn becomes more significant. Further, when Sn is less than about 0.01, the melting point of internal electrodes 3 and 4 falls within a preferable range, so that a defect such as ball formation becomes less likely to occur.

The dielectric layer 2 preferably includes, as a main component, a perovskite-type compound containing Ba and Ti (a portion of Ba can be replaced with Ca, and a portion of Ti can be replaced with Zr). When the main component of dielectric layer 2 is $BaTiO_3$, the multilayer ceramic capacitor according to a preferred embodiment of the present invention is high in dielectricity and exhibits particularly superior reliability. The dielectric layer may contain, as a subcomponent, a rare-earth element and/or Mn, Mg, Si, and other suitable material, for example.

Material powder of a dielectric ceramic is produced, for example, by a solid phase method. In particular, firstly, a compound powder of oxide, carbonate, or the like including a constituent element of the main component is mixed with a predetermined ratio and then calcinated. Methods other than a solid phase method, such as a hydrothermal synthesis method and the like, may be applied. An alkaline metal, a transition metal, Cl, S, P, Hf and the like may be contained in the dielectric ceramic according to a preferred embodiment of the present invention within a range that does not interfere with the advantageous effects of the present invention.

The multilayer ceramic capacitor is produced, for example, in a manner described below. The material powder of a dielectric ceramic obtained as described above is used to produce ceramic slurry. Then, a ceramic green sheet is formed by a sheet forming method and the like. Then conductive paste constituting an internal electrode is applied by printing and the like onto a predetermined ceramic green sheet among a plurality of ceramic green sheets. Then, the plurality of ceramic green sheets are laminated and then adhered with pressure to obtain a raw multilayer body. Then, the raw multilayer body is fired. In this step of firing, a dielectric layer constituted by a dielectric ceramic is obtained. Thereafter, external electrodes are formed on end surfaces of multilayer body by baking and the like.

Next, non-limiting experimental examples based on various preferred embodiments of the present invention will be described below.

Experimental Example 1

In Experimental Example 1, the effect of presence and absence of Sn in the internal electrodes with respect to reliability during application of a voltage was confirmed. In the present experimental example, a method of mixing SnO powder into material powder of dielectric ceramic in advance was used. Further, as a main component of the dielectric layers, barium titanate (hereinafter, referred to as BT) and barium calcium titanate (hereinafter, referred to as BCT) were prepared with two types of compositions.

(A) Production of Material Powder of Dielectric Ceramic

Firstly, BT powder and BCT powder, as main components, were prepared. In particular, $BaCO_3$ powder, $CaCO_3$ powder, and $TiO_3$ powder were weighed so that a molar ratio of Ba with respect to Ti becomes 1−x, and a molar ratio of Ca with respect to Ti becomes x. After being mixed for a predetermined period of time using a ball mill, thermal processing was conducted to obtain BT powder and BCT powder as the main components.

Next, powders of $R_2O_3$ (R is Dy or Y), MgO, MnO, $SiO_2$ and SnO, as subcomponents, were prepared. With respect to 100 molar parts of Ti in ceramic powder of the main component, these powders were weighed so as to have a content of R constituting "a" molar parts, a content of Mg constituting "b" molar parts, a content of Mn constituting "c" molar parts, a content of Si constituting "d" molar parts, and a content of Sn constituting "e" molar parts, and the BT powder and BCT powder, as the main components, were mixed together. After being mixed for a predetermined period of time using a ball mill, the mixture was dried and dry-pulverized. In the manner described above, dielectric ceramic material powders of Sample Nos. 1 to 8 were obtained. Table 1 shows values a, b, c, d, e, x and R components for each sample number.

After conducting ICP emission spectrometry with respect to the obtained material powders, it was confirmed that the powders had substantially the same mixture compositions as those shown in Table 1.

(B) Production of Multilayer Ceramic Capacitor

Firstly, a ceramic green sheet constituting a dielectric layer was formed. In particular, a polyvinyl butyral based binder and an organic solvent such as ethanol were added to the material powder described above, and wet-mixing was conducted using a ball mill to produce a ceramic slurry. Then, the ceramic slurry was formed to have a sheet shape using a doctor blade method, so that a ceramic green sheet having a thickness of 3 μm was obtained.

Next, conductive paste containing Ni as a main component was printed on a predetermined ceramic green sheet to form a conductive paste layer constituting an internal electrode.

Next, a plurality of ceramic green sheets were laminated so as to provide outwardly-extending sides of conductive paste layers alternately, so that a raw multilayer body was formed.

Next, the multilayer body was heated at 350° C. under an $N_2$ atmosphere to burn the binder. Thereafter, under a reduced atmosphere of $H_2$—$N_2$—$H_2O$ gas with a partial oxygen pressure of $10^{-10}$ MPa, the multilayer body was fired in the profile of raising the temperature at the temperature rise rate of 20° C./min, maintaining at the maximum temperature of 1200° C. for 20 minutes, and thereafter lowering the temperature.

Next, on opposite end surfaces of the multilayer body after firing, silver paste including $B_2O_3$—$SiO_2$—$BaO$ glass frit was applied. Then, under the $N_2$ atmosphere, firing was conducted at 600° C. to form external electrodes electrically connected to internal electrodes.

The dimensions of the multilayer ceramic capacitor produced in the manner described above were 2.0 mm×1.0 mm×1.0 mm, and a thickness of the dielectric layer provided between the internal electrodes was 2.5 μm, and a thickness of the internal electrode was 0.8 μm. Further, the number of effective dielectric layers was 100, and a facing electrode area for each layer was $1.7 \times 10^{-6}$ $m^2$.

(C) Characteristics Evaluation

For the multilayer ceramic capacitors obtained under each condition, dielectric constant and dielectric loss were measured. Firstly, electrostatic capacitance and dielectric loss were measured under the condition of AC voltage 1 V, and 1 kHz using automatic bridge-type measurement equipment. Then, a dielectric constant was calculated based on an average value of electrostatic capacitance, a thickness of dielectric layer, the number of layers, and the facing electrode area.

Next, the high temperature load test was conducted under the condition of 175° C. and 7.5 V, and the time period with insulating resistance less than or equal to 100 kΩ was determined as a failure, and the mean time to failure (MTTF) of the sample was calculated. The number of samples measured was 10, and an average value was calculated. The number of samples measured was 10 for each of dielectric constant, dielectric loss, and MTTF, and an average value thereof was calculated.

Table 1 shows various characteristic evaluation results for each condition. In Table 1, the sample number with "*" is a sample outside the scope of the present invention.

(D) Confirmation of Presence of Sn in Internal Electrode

1) Polishing

Each sample was set up perpendicularly, and a periphery of each sample was fixed by resin. In this stage, a WT (width and height) side surface of each sample was exposed.

Next, the WT side surface was polished using a polishing machine.

Next, the polishing was terminated at about one-half depth in the direction L (length) of an element assembly to expose the WT cross section.

After the polishing was terminated, the polished surface was worked by ion-milling to eliminate unevenness of the internal electrodes due to polishing.

2) Mapping Analysis for Internal Electrodes

Figure 2:
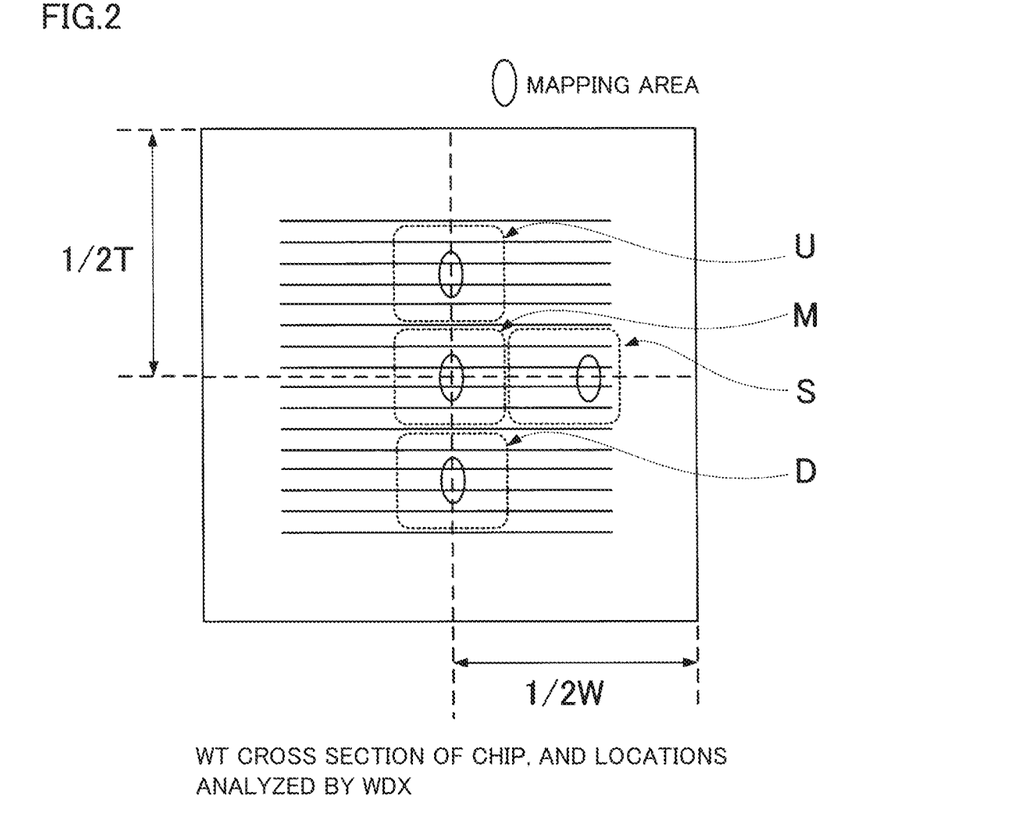
FIG. 2 illustrates locations of a multilayer ceramic capacitor at which the mapping analysis for Ni and Sn was conducted using WDX in accordance with Experimental Example 1.

As shown in FIG. 2, at about one-half location in the W direction of the WT cross section, the region including laminated internal electrodes of the sample was divided into three portions evenly in the T direction, so that the central portion in the W direction of each was divided into three regions including an upper region U, a middle region M, and a lower region D. Further, the central portion in the T direction was divided into two regions including middle region M and a side region S adjacent to intermediate area M in the W direction with two regions.

The mapping analysis for Ni and Sn was conducted using the WDX in these four regions. In the side area S, the mapping was conducted with respect to not in the central region but the portion including internal electrode close to the side portion of the multilayer body having no internal electrode.

Figure 3:
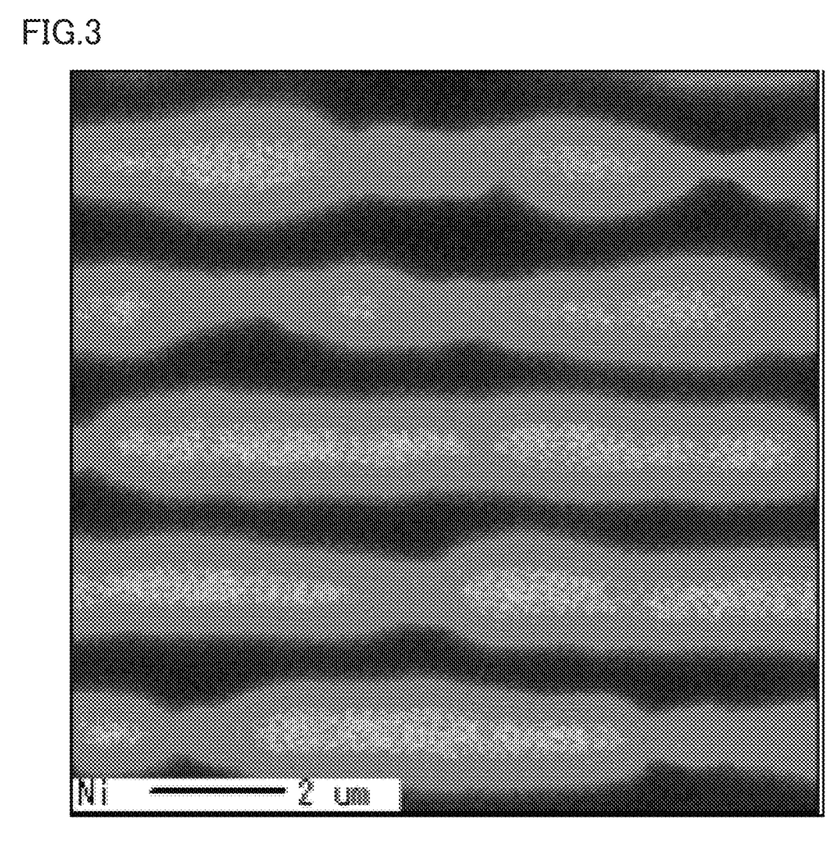
FIG. 3 represents the result of mapping analysis for Ni using WDX in accordance with Experimental Example 1.
Figure 4:
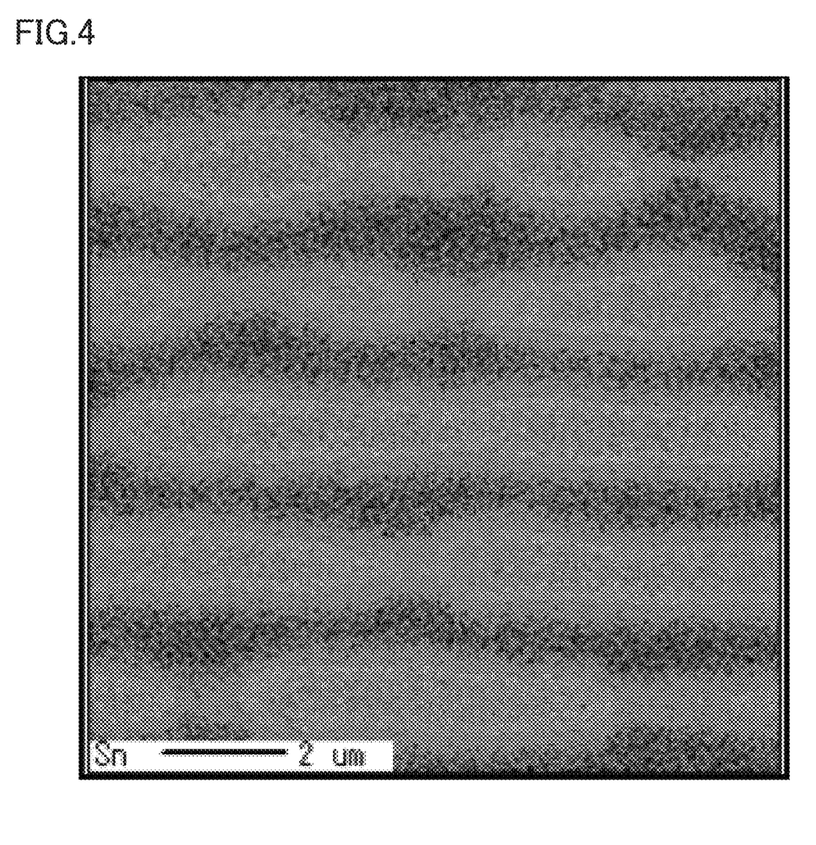
FIG. 4 represents the result of mapping analysis for Sn using WDX in accordance with Experimental Example 1.

FIG. 3 shows the result of the mapping analysis for Ni in the sample including Sn material powder in the material powder of dielectric ceramic. FIG. 4 shows the result of the mapping analysis for Sn. As can be seen from FIGS. 3 and 4, for the sample including Sn material powder in the material powder of dielectric ceramic, Sn was present in the internal electrodes in all the regions of upper region U, middle region M, lower region D, and side region S.

(E) Confirmation of Sn/(Ni+Sn) Values in Internal Electrode

For the samples including the Sn material powder in the material powder of dielectric ceramic (Sample Material Nos. 1, 3, 5, 7), Sn/(Ni+Sn) values in the internal electrode were confirmed. In particular, three internal electrodes were selected randomly from one multilayer ceramic capacitor, and only internal electrode portions were cut out respectively by FIB fabrication (Focus Ion Beam method) to prepare three pieces of samples formed to be thin layers. Quantitative analysis for Ni and Sn was conducted using the WDX at ten locations randomly extracted from each sample. An average value of thirty locations in total (ten locations×three pieces) was calculated, and each sample had Sn/(Ni+Sn)=0.006.

(F) Confirmation of Alloying of Sn Contained in Internal Electrode with Respect to Ni The fired multilayer ceramic capacitor (multilayer body) was pulverized to have a powder form. The powder was analyzed using the XRD, and it was discovered that a peak position of Ni was shifted. According to this result, it was discovered that Sn in the internal electrode was present in the formation of alloy of Ni and Sn.

TABLE 1

| Sample No. | x | R | a | b | c | d | e | Dielectric Constant | Dielectric Loss (%) | MTTF (time) |
|---|---|---|---|---|---|---|---|---|---|---|
| 1 | 0 | Dy | 0.5 | 1 | 0.2 | 1 | 1 | 4110 | 3.1 | 13 |
| 2* | 0 | Dy | 0.5 | 1 | 0.2 | 1 | 0 | 4180 | 3.2 | 4 |
| 3 | 0 | Dy | 2 | 1 | 0.5 | 1.5 | 1 | 2080 | 1.8 | 60 |
| 4* | 0 | Dy | 2 | 1 | 0.5 | 1.5 | 0 | 2130 | 1.9 | 22 |
| 5 | 0.05 | Dy | 1.5 | 1 | 0.5 | 1.3 | 1 | 3610 | 8.5 | 32 |
| 6* | 0.05 | Dy | 1.5 | 1 | 0.5 | 1.3 | 0 | 3520 | 9.3 | 11 |
| 7 | 0.05 | Y | 4 | 1 | 0.5 | 2 | 1 | 1450 | 6.1 | 48 |
| 8* | 0.05 | Y | 4 | 1 | 0.5 | 2 | 0 | 1480 | 6.2 | 15 |

Sample Nos. 1-4 have BT as a main component of dielectric layer. Sample Nos. 1 and 3 containing Sn have similar dielectric characteristics and greater MTTF values as compared to Sample Nos. 2 and 4. Further, Samples Nos. 5-8 have BCT as a main component of dielectric layer. Sample Nos. 5 and 7 containing Sn have similar dielectric characteristics and greater MTTF values as compared to Sample Nos. 6 and 8.

Experimental Example 2

In Experimental Example 2, the effect of the amount of Sn contained internal electrode with respect to reliability during application of a voltage was confirmed. In the present experimental example, conductive paste constituting an internal electrode and containing an alloy of Ni and Sn as a main component was used. Further, a dielectric ceramic having the same condition as Sample No. 6 of Experimental Example 1 was used. The method for manufacturing a multilayer ceramic capacitor was the same as in Experimental Example 1. A thickness of dielectric layer provided between internal electrodes produced in the multilayer ceramic capacitor was 2.5 μm. Table 2 shows molar ratios of Sn with respect to a sum of Ni and Sn in the internal electrode and the results of various characteristic evaluations under the condition of each Sample Number.

TABLE 2

| Sample No. | Sn/(Ni + Sn) | Dielectric constant | Dielectric Loss (%) | MTTF (time) |
|---|---|---|---|---|
| 11* | 0 | 3560 | 9.3 | 11 |
| 12 | 0.005 | 3620 | 8.7 | 33 |
| 13 | 0.01 | 3630 | 8.9 | 28 |
| 14 | 0.05 | 3580 | 9.1 | 31 |
| 15 | 0.1 | 3510 | 9.3 | 29 |

Comparing Sample Nos. 11-15, dielectric characteristics of Sample Nos. 12-15 were substantially the same, and values of MTTF were greater as compared to the case of Sample No. 11 containing no Sn.

Experimental Example 3

In Experimental Example 3, a thickness of the dielectric layer was changed, and the effect with respect to the MTTF was examined. In the present Experimental Example, the method of mixing SnO powder into material powder of dielectric ceramic in advance was used. Further, the main component of dielectric layer was barium titanate (BT).

(A) Production of Material Powder of Dielectric Ceramic

Firstly, BT powder, as a main component, was prepared. In particular, $BaCO_3$ powder and $TiO_2$ powder were weighed so that a molar ratio of Ba with respect to Ti becomes 1:1. After being mixed for a predetermined period of time using a ball mill, thermal processing was conducted to obtain BT powder as the main component.

Next, powders of $R_2O_3$ (R is Dy), MgO, MnO, $SiO_2$, and SnO, as subcomponents, were prepared. In the present Experimental Example, R was Dy. With respect to 100 molar parts of Ti in ceramic powder of the main component, these powders were weighed so as to have a content of R constituting "a" molar parts, a content of Mg constituting "b" molar parts, a content of Mn constituting "c" molar parts, and a content of Si constituting "d" molar parts, and SnO was weighed so that a molar ratio Sn/(Ni+Sn) of Sn with respect to a of Ni and Sn contained in the internal electrode including a multilayer ceramic capacitor provided thereon has values shown in Table 3. After being mixed with the BT powder of the main component for predetermined period of time using a ball mill, the mixture was dried and dry-pulverized. In the manner described above, the material powders of dielectric ceramics according to Sample Nos. 21-36 were obtained. The values a, b, c, d, e for each Sample Number are shown in Table 3.

(B) Production of Multilayer Ceramic Capacitor

Firstly, a ceramic green sheet constituting a dielectric layer was formed. In particular, a polyvinyl butyral based binder and an organic solvent such as ethanol were added to the material powder described above, and wet-mixing was conducted using a ball mill to produce ceramic slurry. Then, the ceramic slurry was formed to have a sheet shape using a doctor blade method, so that ceramic green sheets having eight types of thicknesses, in particular, ceramic green sheets having eight types of thicknesses including 0.9 μm, 1.1 μm, 1.3 μm, 1.6 μm, 2.0 μm, 2.2 μm, 2.7 μm, and 3.3 μm were obtained.

Next, conductive paste containing Ni as a main component was printed on a predetermined ceramic green sheet to form a conductive paste layer constituting an internal electrode.

Next, a plurality of ceramic green sheets were laminated so as to provide outwardly-extending sides of conductive paste layers alternately, so that a raw multilayer body was formed.

Next, the multilayer body was heated at 350° C. under an $N_2$ atmosphere to burn the binder. Thereafter, under a reduced atmosphere of $H_2$—$N_2$—$H_2O$ gas with a partial oxygen pressure of $10^{-10}$ MPa, the multilayer body was fired in the profile of raising the temperature at the temperature rise rate of 20° C./min, maintaining at the maximum temperature of 1200° C. for 20 minutes, and thereafter lowering the temperature.

Next, on opposite end surfaces of the multilayer body after firing, silver paste including $B_2O_3$—$SiO_2$—BaO glass frit was applied. Then, under the $N_2$ atmosphere, firing was conducted at 600° C. to form external electrodes electrically connected to internal electrodes.

The dimensions of the multilayer ceramic capacitor produced in the manner described above are 2.0 mm×1.0 mm×1.0 mm. Further, the number of effective dielectric layers was 100, and a facing electrode area for each layer was $1.7 \times 10^{-6}$ $m^2$.

The produced external electrodes of the multilayer ceramic capacitor were removed and melted by a solvent, and the ICP emission spectroscopic analysis was conducted. The result confirmed that the mixture composition was substantially the same as that in Table 3, except for Ni as an internal electrode component and Sn causing diffusion into internal electrodes.

For each sample, a thickness of a dielectric layer was measured by the following method.

Each sample was set up perpendicularly, and a periphery of each sample was fixed by resin. In this stage, an LT side surface of each sample (length, height side surface; the surface exposing internal electrodes including connection portions to external electrodes after polishing) was exposed. The LT side surface was polished using a polishing machine. The polishing was terminated at about one-half depth in the W direction (width direction) of the multilayer body to expose the LT cross section. The polished surface was worked by ion-milling to eliminate unevenness due to the polishing. In the manner described above, a cross section for monitoring was obtained.

Figure 5:
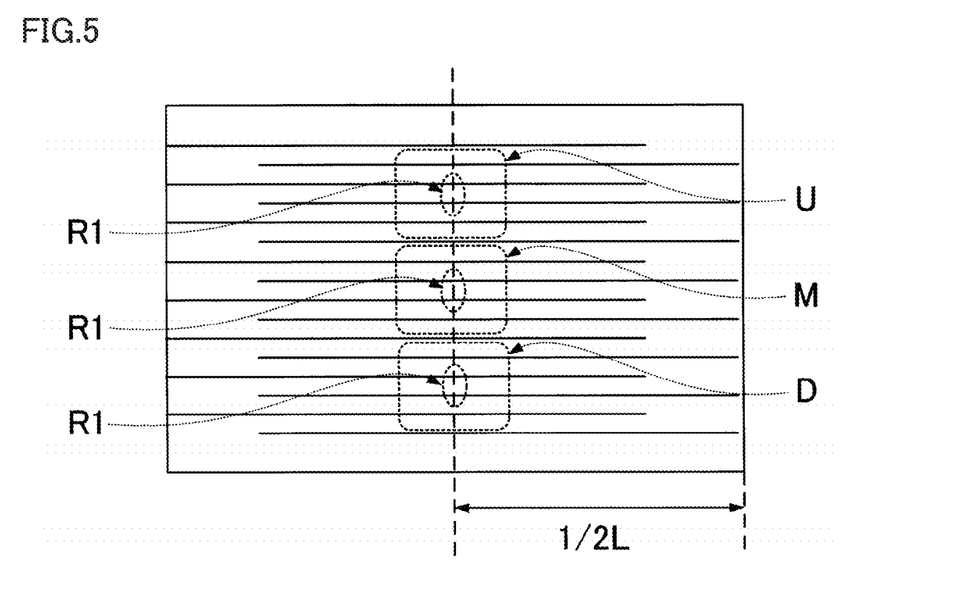
FIG. 5 illustrates locations at which a thickness of a dielectric layer was measured in accordance with Experimental Example 3.

As shown in FIG. 5, at about one-half location in the L direction (length direction) of the LT cross section, a perpendicular line was drawn perpendicularly to the internal electrodes. Next, the region including laminated internal electrodes of the sample was divided into three portions evenly in the T direction (height direction) to have three regions including an upper portion U, a middle portion M, and a lower portion D. Then, twenty five dielectric layers were selected from the central portion in the height direction of each region (the region including the twenty five dielectric layers is indicated as measurement area R1 in FIG. 5), and a thickness of these dielectric layers on the perpendicular line was measured. The dielectric layers, which could not be measured due to combining of dielectric layers sandwiching internal electrodes by breakage of internal electrodes on the perpendicular line, were removed from the subject of measurement.

As described above, for each sample, a thickness of dielectric layer was measured at 75 locations, and an average value was calculated. The thickness of dielectric layer was, as shown in Table 3, 0.8 μm, 1 μm, 1.2 μm, 1.5 μm, 1.8 μm, 2 μm, 2.5 μm and 3 μm depending on samples.

(C) Characteristics Evaluation

For the multilayer ceramic capacitors obtained under each condition, dielectric constant and dielectric loss were measured. Firstly, electrostatic capacitance and dielectric loss were measured under the condition of AC voltage of 1 V, 1 kHz using automatic bridge-type measurement equipment. Then, a dielectric constant was calculated based on an average value of electrostatic capacitance, a thickness of dielectric layer, the number of layers, and the facing electrode area.

Next, the high temperature load test was conducted under the condition of 150° C. and 3 V/μm, and the time period with insulating resistance less than or equal to 100 kΩ was determined as a failure, and the mean time to failure (MTTF) of the sample was calculated. The number of samples measured was 10, and an average value was calculated. The number of samples measured was 10 for each of dielectric constant, dielectric loss, and MTTF, and an average value thereof was calculated.

Table 3 shows various characteristic evaluation results for each condition. In Table 3, the sample number with "*" is a sample outside the scope of the present invention.

(D) Confirmation of Presence of Sn in Internal Electrode

In a manner similar to Experimental Example 1, for each sample, the mapping analysis for Ni and SN was conducted using the WDX. Consequently, in the samples containing Sn material powder in material powder of dielectric ceramic, Sn was present in the internal electrode.

(E) Confirmation of Sn/(Ni+Sn) Value in Internal Electrode

For the samples including the Sn material powder in material powder of dielectric ceramic, Sn/(Ni+Sn) values in the internal electrode were confirmed. In particular, three internal electrodes were selected randomly from one chip, and only internal electrode portions were cut out respectively by FIB fabrication (Focus Ion Beam method) to prepare three pieces of samples formed to be thin layers. Quantitative analysis for Ni and SN was conducted using WDX at ten locations randomly extracted from each sample. Average values of thirty locations in total (ten locations×three pieces) are values of Sn/(Ni+Sn) shown in Table 3.

(F) Confirmation of Alloying of Sn Contained in Internal Electrode with Respect to Ni After removing external electrodes of multilayer ceramic capacitor, the multilayer ceramic capacitor was pulverized to have a powder form. The powder was analyzed using the XRD, and it was discovered that a peak position of Ni was shifted. According to this result, it was discovered that, according to the present Experimental Example, Sn in the internal electrode was present in a form of alloy of Ni and Sn.

TABLE 3

| Sample No. | R | a | b | c | d | Sn/(Ni + Sn) | Dielectric layer Thickness (μm) | Dielectric Constant (μm) | Dielectric Loss (%) | MTTF (time) |
|---|---|---|---|---|---|---|---|---|---|---|
| 21* | Dy | 1 | 1 | 0.2 | 1 | 0 | 0.8 | 4350 | 3.2 | 0.3 |
| 22* | Dy | 1 | 1 | 0.2 | 1 | 0 | 1 | 4272 | 3.2 | 0.6 |
| 23* | Dy | 1 | 1 | 0.2 | 1 | 0 | 1.2 | 4266 | 3.2 | 1 |
| 24* | Dy | 1 | 1 | 0.2 | 1 | 0 | 1.5 | 4233 | 3.2 | 4 |
| 25* | Dy | 1 | 1 | 0.2 | 1 | 0 | 1.8 | 4258 | 3.2 | 13 |
| 26* | Dy | 1 | 1 | 0.2 | 1 | 0 | 2 | 4218 | 3.2 | 29 |
| 27* | Dy | 1 | 1 | 0.2 | 1 | 0 | 2.5 | 4299 | 3.2 | 194 |
| 28* | Dy | 1 | 1 | 0.2 | 1 | 0 | 3 | 4211 | 3.2 | 1309 |
| 29 | Dy | 1 | 1 | 0.2 | 1 | 0.01 | 0.8 | 4337 | 3.1 | 10 |
| 30 | Dy | 1 | 1 | 0.2 | 1 | 0.01 | 1 | 4225 | 3.1 | 16 |
| 31 | Dy | 1 | 1 | 0.2 | 1 | 0.01 | 1.2 | 4265 | 3.1 | 26 |
| 32 | Dy | 1 | 1 | 0.2 | 1 | 0.01 | 1.5 | 4218 | 3.1 | 50 |
| 33 | Dy | 1 | 1 | 0.2 | 1 | 0.01 | 1.8 | 4237 | 3.1 | 99 |
| 34 | Dy | 1 | 1 | 0.2 | 1 | 0.01 | 2 | 4256 | 3.1 | 154 |
| 35 | Dy | 1 | 1 | 0.2 | 1 | 0.01 | 2.5 | 4229 | 3.1 | 474 |
| 36* | Dy | 1 | 1 | 0.2 | 1 | 0.01 | 3 | 4231 | 3.1 | 1455 |

Sample Nos. 29-36 containing Sn have improved MTTF values with the similar dielectric characteristics and as compared to Sample Nos. 21-28 containing no Sn. However, even in the case of containing Sn, when the thickness of dielectric layer is greater than 2.5 μm, particularly, in Sample No. 36 having a dielectric layer thickness of 3 μm, MTTF is less likely to be improved as compared to Sample Nos. 29-35 having a dielectric layer thickness lower than or equal to 2.5 μm.

Figure 6:
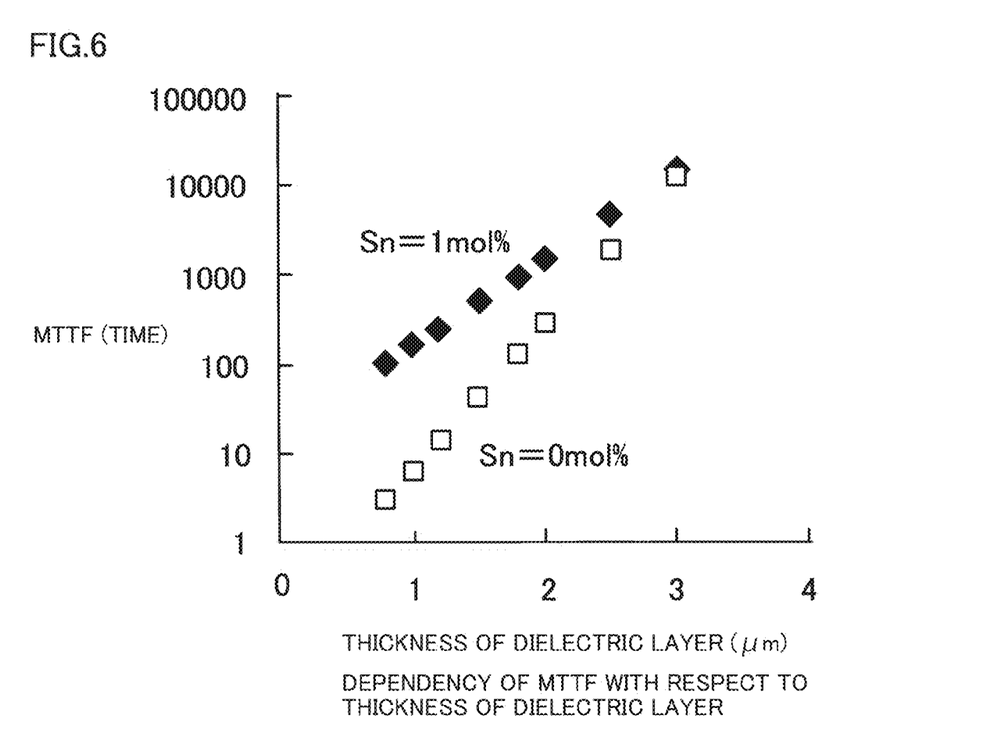
FIG. 6 is a graph showing dependency of MTTF with respect to thicknesses of a dielectric layer in accordance with Experimental Example 3.

FIG. 6 shows dependency of MTTF with respect to thicknesses of a dielectric layer. When the thickness of the dielectric layer exceeds 2.5 μm, contribution of an interface to reliability became smaller. Therefore, the effect of adding Sn is weakened, so that the MTTF became less likely to improve.

In other words, while the region sandwiched by internal electrodes facing each other is constituted by "a dielectric layer" and "an interface between internal electrodes and dielectric layer", when the thickness of the dielectric layer exceeds 2.5 μm, a ratio of "dielectric layer" in the areas sandwiched by internal electrode facing each other becomes higher, so that the ratio of "an interface between internal electrodes and dielectric layer" becomes smaller on the contrary. Although the detailed mechanism is not clear, according to various preferred embodiments of the present invention, changes in "interface" due to addition of Sn to internal electrodes is thought to have contribution to improvement in reliability, and it was thought that the effect of improving MTTF is thought to became smaller due to lowering in ratio of interface by the thickness of dielectric layer beyond 2.5 μm as described above.

Experimental Example 4

In Experimental Example 4, the method of mixing powder of Sn material in advance to material powder of dielectric ceramic was used. Further, as a main component of the dielectric layer, barium titanate (BT) was prepared.

(A) Production of Material Powder of Dielectric Ceramic

Firstly, BT powder, as a main component, was prepared. In particular, $BaCO_3$ powder and $TiO2$ powder were weighed so that a molar ratio of Ba with respect to Ti becomes 1:1. After being mixed for a predetermined period of time using a ball mill, thermal processing was conducted to obtain BT powder as the main component.

Next, powders of $DyO_2O_3$, MgO, MnO and $SiO_2$, as subcomponents, were prepared. Further, powders of Sn material such as Sn metal powder, SnO powder, $SnO_2$ powder, and Ni—Sn alloy powder (Ni:Sn=90:10) were prepared. With respect to 100 molar parts of Ti in the main component, these powders were weighed so as to have 0.5 molar parts (=Dy is 1.0 molar part) $Dy_2O_3$, 1 molar part of MgO, 0.2 polar parts of MnO, and 1 molar part of $SiO_2$, and Sn material was weighed so that Sn has amounts shown in Table 4 with respect to Ni contained in the internal electrodes after the multilayer ceramic capacitor was formed. After blending these powders with the BT powder of the main component, and mixing the powders using a ball mill for a predetermined period of time, the mixture was dried and dry-pulverized, so that material powder was obtained.

(B) Production of Multilayer Ceramic Capacitor

Firstly, a ceramic green sheet constituting a dielectric layer was formed. In particular, a polyvinyl butyral based binder and an organic solvent such as ethanol were added to the material powder described above, and wet-mixing was conducted using a ball mill to produce ceramic slurry. Then, the ceramic slurry was formed to have a sheet shape using a doctor blade method, so that a ceramic green sheet having a thickness of 3 μm was obtained.

Next, conductive paste containing Ni as a main component was printed on a predetermined ceramic green sheet to form a conductive paste layer constituting an internal electrode.

Next, a plurality of ceramic green sheets were laminated so as to provide outwardly-extending sides of conductive paste layers alternately, so that a raw multilayer body was formed.

Next, the multilayer body was heated at 350° C. under the $N_2$ atmosphere to burn the binder. Thereafter, under a reduced atmosphere of $H_2$—$N_2$—$H_2O$ gas with a partial oxygen pressure $10^{-10}$ MPa, the multilayer body was fired in the profile of raising the temperature at the temperature rise rate of 20° C./min, maintaining at the maximum temperature of 1200° C. for 20 minutes, and thereafter lowering the temperature.

Next, on opposite end surfaces of the multilayer body after firing, silver paste including $B_2O_3$—$SiO_2$—BaO glass frit was applied. Then, under the $N_2$ atmosphere, firing was conducted at 600° C. to form external electrodes electrically connected to internal electrodes.

The dimensions of the multilayer ceramic capacitor produced in the manner described above were 2.0 mm×1.0 mm×1.0 mm. The thickness of the dielectric layer provided between the internal electrodes was 2.5 μm. Further, the number of effective dielectric layers was 230, and a facing electrode area of each layer was $1.7×10^{-6}$ $m^2$.

(C) Characteristics Evaluation

For the multilayer ceramic capacitors obtained under each condition, dielectric constant and dielectric loss were measured. Firstly, electrostatic capacitance and dielectric loss were measured under the condition of AC voltage 1 V, 1 kHz using automatic bridge-type measuring equipment. Then, a dielectric constant was calculated based on an average value of electrostatic capacitance, a thickness of dielectric layer, the number of layers, the facing electrode area.

Next, the high temperature load test was conducted under the condition of 150° C., 7.5 V. The time when the insulating resistance became less than or equal to 10 kΩ was determined as a failure, and the mean time to failure (MTTF) of the sample was calculated. The number of samples measured was 10, and an average value was calculated. Further, the number of samples measured was 10 for each of dielectric constant, dielectric loss, and MTTF, and average value thereof was calculated.

Table 4 shows results of various characteristics evaluations under each condition.

(D) Confirmation of Presence of Sn in Internal Electrodes

1) Polishing

Each sample was set up perpendicularly, and a periphery of each sample was fixed by resin. In this stage, a WT (width and height) side surface of each sample was exposed.

Next, the WT side surface was polished using a polishing machine.

Next, the polishing was terminated at about one-half depth in the direction L (length) of an element assembly to expose the WT cross section.

After the polishing was terminated, the polished surface was worked by ion-milling to eliminate unevenness of the internal electrodes due to polishing.

2) Mapping Analysis for Internal Electrodes

Similarly to Experimental Example 1, as shown in FIG. 2, at about one-half location in the W direction of the WT cross section, the region including laminated internal electrodes of the sample was divided into three portions evenly in the T direction, so that the central portion in the W direction of each was divided into three regions including an upper region U, a middle region M, and a lower region D. Further, the central portion in the T direction was divided into two regions including middle region M and a side region S adjacent to intermediate area M in the W direction with two regions.

The mapping analysis for Ni and Sn was conducted using the WDX in these four regions. In the side area S, the mapping was conducted with respect to not in the central region but the portion including internal electrode closer to the side portion of the multilayer body having no internal electrode. For the sample including Sn material powder in the material powder of dielectric ceramic, Sn was present in the internal electrodes in all the regions of upper region U, middle region M, lower region D, and side region S.

(E) Confirm Sn/(Ni+Sn) Values in Internal Electrode

For the sample material including Sn material powder in the material powder of dielectric ceramic, Sn (Ni+Sn) values in the internal electrode were confirmed. In particular, three internal electrodes were selected randomly from one multilayer ceramic capacitor, and only internal electrode portions were cut out respectively by FIB processing (Focus Ion Beam method) to prepare three pieces of samples formed to be thin layers. Quantitative analysis for Ni and Sn was conducted using the WDX at ten locations randomly extracted from each sample. Average values of thirty locations in total (ten locations×three pieces) are values of Sn/(Ni+Sn) shown in Table 4.

(F) Confirm Alloying of Sn Contained in Internal Electrode with Respect to with Ni The fired multilayer ceramic capacitor (multilayer body) was pulverized to have a powder form. The powder was analyzed using the XRD, and it was discovered that a peak position of Ni was shifted. According to this result, it was discovered that Sn in the internal electrode was present in a form of alloy of Ni and Sn.

TABLE 4

| Sample No. | Form of Adding Sn Material to Ceramic Raw Material | Sn/(Ni + Sn) | Relative Dielectric Constant | Dielectric Loss (%) | MTTF (time) |
|---|---|---|---|---|---|
| 41* | Not Added | *** | 4299 | 3.2 | 194 |
| 42 | Sn metal | 0.0010 | 4272 | 3.0 | 385 |
| 43 | Sn metal | 0.0050 | 4269 | 3.1 | 405 |
| 44 | Sn metal | 0.0100 | 4245 | 3.3 | 450 |
| 45 | Sn metal | 0.0500 | 4239 | 3.2 | 431 |
| 46 | Sn metal | 0.1000 | 4293 | 3.2 | 396 |
| 47* | Sn metal | 0.1200 | 4280 | 3.1 | 129 |
| 48 | SnO | 0.0010 | 4259 | 3.0 | 380 |
| 49 | SnO | 0.0050 | 4250 | 3.0 | 412 |
| 50 | SnO | 0.0100 | 4272 | 3.3 | 444 |
| 51 | SnO | 0.0500 | 4242 | 3.2 | 424 |
| 52 | SnO | 0.1000 | 4302 | 3.1 | 400 |
| 53* | SnO | 0.1200 | 4289 | 3.1 | 137 |
| 54 | $SnO_2$ | 0.0010 | 4287 | 3.0 | 411 |
| 55 | $SnO_2$ | 0.0050 | 4255 | 3.0 | 451 |
| 56 | $SnO_2$ | 0.0100 | 4263 | 3.2 | 482 |
| 57 | $SnO_2$ | 0.0500 | 4268 | 3.2 | 460 |
| 58 | $SnO_2$ | 0.1000 | 4268 | 3.2 | 425 |
| 59* | $SnO_2$ | 0.1200 | 4295 | 3.3 | 149 |
| 60 | Ni—Sn alloy | 0.0010 | 4277 | 3.0 | 413 |

In the case where Sn material was added in advance to material powder of dielectric ceramic, improvement in MTTF was confirmed with substantially the similar dielectric characteristics, regardless of a type of Sn material. However, when the Sn material was added to an extent of exceeding the Sn/(Ni+Sn) value of 0.1, no improvement in MTTF could be seen. When the Sn/(Ni+Sn) value exceeds 0.1, formation of balls in the internal electrodes occurs due to excessive lowering of the melting point in the internal electrodes. This caused the internal electrodes to be partially thickened and resulted in partially thinner thickness of the dielectric layer, so that the MTTF was thought not to be improved (the effect of adding Sn was balanced out).

Experimental Example 5

In Experimental Example 5, the method of mixing the powder of Sn material into internal electrode paste in advance was used. Further, barium titanate (BT) was prepared, as a main component of dielectric layer.

(A) Production of Raw Material Powder of Dielectric Ceramic

Firstly, BT powder, as a main component, was prepared. In particular, $BaCO_3$ powder and $TiO_2$ powder were weighed so that a molar ratio of Ba with respect to Ti becomes 1:1. After being mixed for a predetermined period of time using a ball mill, thermal processing was conducted to obtain BT powder as the main component.

Next, powders of $Dy_2O_3$, MgO, MnO, and $SiO_2$, as sub-components, were prepared. Then, with respect to 100 molar parts of the main component, these powders were weighed so as to have 0.5 molar parts of $Dy_2O_3$, 1 molar part of MgO, 0.2 molar parts of MnO, and 1 molar part of $SiO_2$. These powders were blended with BT powder of the main component. After being mixed for a predetermined period of time using a ball mill, the mixture was dried and dry-pulverized to obtain raw material powder.

(B) Production of Multilayer Ceramic Capacitor

Firstly, a ceramic green sheet constituting a dielectric layer was formed. In particular, a polyvinyl butyral based binder and an organic solvent such as ethanol were added to the material powder described above, and wet-mixing was conducted using a ball mill to produce ceramic slurry. Then, the ceramic slurry was formed to have a sheet shape using a doctor blade method, so that a ceramic green sheet having a thickness of 3 μm was obtained.

Next, internal electrode paste was prepared. Firstly, SnO powder, $SnO_2$ powder, and Ni—Sn alloy powder (Ni:Sn=90:10) were prepared as metal powder and weighed to have ratios shown in Table 5. Then, a polyvinyl butyral based binder and an organic solvent such as ethanol were added to conduct wet-mixing using a ball mill to produce conductive paste.

Next, the conductive paste described above was printed on the ceramic green sheet described above to form a conductive paste layer constituting an internal electrode.

Next, a plurality of ceramic green sheets were laminated so as to provide outwardly-extending sides of conductive paste layers alternately, so that a raw multilayer body was formed.

Next, the multilayer body was heated at 350° C. under an $N_2$ atmosphere to burn the binder. Thereafter, under a reduced atmosphere of $H_2$—$N_2$—$H_2O$ gas with a partial oxygen pressure of $10^{-10}$ MPa, the multilayer body was fired in the profile of raising the temperature at the temperature rise rate of 20° C./min, maintaining at the maximum temperature of 1200° C. for 20 minutes, and thereafter lowering the temperature.

Next, on opposite end surfaces of the multilayer body after firing, silver paste including $B_2O_3$—$SiO_2$—BaO glass frit was applied. Then, under the $N_2$ atmosphere, firing was conducted at 600° C. to form external electrodes electrically connected to internal electrodes.

The dimensions of the multilayer ceramic capacitor produced in the manner described above were 2.0 mm×1.0 mm×1.0 mm, and a thickness of the dielectric layer provided between the internal electrodes was 2.5 μm. Further, the number of effective dielectric layers was 230, and a facing electrode area for each layer was $1.7 \times 10^{-6}$ $m^2$.

(C) Characteristics Evaluation

For the multilayer ceramic capacitors obtained under each condition, dielectric constant and dielectric loss were measured. Firstly, electrostatic capacitance and dielectric loss were measured under the condition of AC voltage 1 V, 1 kHz using automatic bridge-type measuring equipment. Then, a dielectric constant was calculated based on the average value of electrostatic capacitance, the thickness of dielectric layer, the number of layers, and the facing electrode area.

Next, the high temperature load test was conducted under the condition of 150° C., 7.5 V, and the time with insulating resistance less than or equal to 10 kΩ was determined as a failure, and the mean time to failure (MTTF) of the sample was calculated. The number of samples measured was 10, and an average value was calculated. Further, the number of samples measured was 10 for each of dielectric constant, dielectric loss, and MTTF, and average value thereof was calculated.

Table 5 shows results of various characteristics evaluations under each condition.

By the method that is substantially the same as Experimental Example 4, it was confirmed that the Sn/(Ni+Sn) in the internal electrode of the fired multilayer ceramic capacitor has substantially the same mixture composition, and that Sn was present in the internal electrode and alloyed with Ni.

TABLE 5

| Sample No. | Form of Adding Sn Material to Ceramic Raw Material | Sn/(Ni + Sn) | Relative Dielectric Constant | Dielectric Loss (%) | MTTF (time) |
|---|---|---|---|---|---|
| 41* | Not Added | *** | 4299 | 3.2 | 194 |
| 61 | Sn metal | 0.0010 | 4236 | 3.2 | 399 |
| 62 | Sn metal | 0.0050 | 4281 | 3.1 | 421 |
| 63 | Sn metal | 0.0100 | 4233 | 3.0 | 447 |
| 64 | Sn metal | 0.0500 | 4281 | 3.3 | 438 |
| 65 | Sn metal | 0.1000 | 4277 | 3.3 | 421 |
| 66* | Sn metal | 0.1200 | 4306 | 3.2 | 147 |
| 67 | SnO | 0.0010 | 4250 | 3.0 | 382 |
| 68 | SnO | 0.0050 | 4255 | 3.0 | 391 |
| 69 | SnO | 0.0100 | 4293 | 3.1 | 426 |
| 70 | SnO | 0.0500 | 4312 | 3.1 | 408 |
| 71 | SnO | 0.1000 | 4261 | 3.1 | 416 |
| 72* | SnO | 0.1200 | 4243 | 3.3 | 135 |
| 73 | $SnO_2$ | 0.0010 | 4259 | 3.2 | 401 |
| 74 | $SnO_2$ | 0.0050 | 4305 | 3.0 | 410 |
| 75 | $SnO_2$ | 0.0100 | 4264 | 3.0 | 457 |
| 76 | $SnO_2$ | 0.0500 | 4242 | 3.2 | 424 |
| 77 | $SnO_2$ | 0.1000 | 4299 | 3.2 | 416 |
| 78* | $SnO_2$ | 0.1200 | 4280 | 3.2 | 152 |
| 79 | Ni—Sn alloy | 0.0010 | 4266 | 3.3 | 400 |

In the case where Sn material was added in advance to internal electrode paste, improvement in MTTF was confirmed with similar dielectric characteristics, regardless of a type of Sn material. However, there was no improvement in MTTF when the Sn material was added to an extent of exceeding the Sn/(Ni+Sn) value of 0.1. When the Sn/(Ni+Sn) value exceeds 0.1, ball formation in the internal electrodes occurs due to excessive lowering of melting point in the internal electrodes. This caused the internal electrodes to be partially thickened and resulted in a partially reduced thickness of the dielectric layer, so that the MTTF was thought not to be improved (the effect of adding Sn was balanced out).

Experimental Example 6

In the Experimental Example 6, the method of using Ni—Sn alloy as metal powder for internal electrode paste was used. Further, barium titanate (BT), as a main component of dielectric layer, was prepared.

(A) Production of Raw Material Powder of Dielectric Ceramic

Firstly, BT powder, as a main component, was prepared. In particular, $BaCO_3$ powder and $TiO_2$ powder were weighed so that a molar ratio of Ba with respect to Ti becomes 1:1. After being mixed for a predetermined period of time using a ball mill, thermal processing was conducted to obtain BT powders as the main component.

Next, powders of $Dy_2O_3$, MgO, MnO and $SiO_2$, as sub-components, were prepared. Further, with respect to 100 molar parts of the main component, the powders where weighed so as to have 0.5 molar parts of $Dy_2O_3$, 1 molar part of MgO, 0.2 molar parts of MnO, and 1 molar part of $SiO_2$. After blending these powders to the BT powder of the main component, and mixing the powders using a ball mill for a predetermined period of time, the mixture was dried and dry-pulverized, so that material powder was obtained.

(B) Production of Multilayer Ceramic Capacitor

Firstly, a ceramic green sheet constituting a dielectric layer was formed. In particular, a polyvinyl butyral based binder and an organic solvent such as ethanol were added to the material powder described above, and wet-mixing was conducted using a ball mill to produce ceramic slurry. Then, the ceramic slurry was formed to have a sheet shape using a doctor blade method, so that a ceramic green sheet having a thickness of 3 μm was obtained.

Next, internal electrode paste using Ni—Sn alloy powder as metal powder was prepared. The Ni—Sn alloy powder having the Sn/(Ni+Sn) ratio shown in Table 6 was prepared, and a polyvinyl butyral base binder and an organic solvent such as ethanol were added, and wet-mixing was conducted using a ball mill, so that conductive paste was produced.

Next, conductive paste described above was printed on the ceramic green sheet described above to form a conductive paste layer constituting internal electrodes.

Next, a plurality of ceramic green sheets were laminated so as to provide outwardly-extending sides of conductive paste layers alternately, so that a raw multilayer body was formed.

Next, the multilayer body was heated at 350° C. under the $N_2$ atmosphere to burn the binder. Thereafter, under a reduced atmosphere of $H_2$—$N_2$—$H_2O$ gas with a partial oxygen pressure $10^{-10}$ MPa, the multilayer body was fired in the profile of raising the temperature at the temperature rise rate of 20° C./min, maintaining at the maximum temperature of 1200° C. for 20 minutes, and thereafter lowering the temperature.

Next, on opposite end surfaces of the multilayer body after firing, silver paste including $B_2O_3$—$SiO_2$—BaO glass frit was applied. Then, under the $N_2$ atmosphere, firing was conducted at 600° C. to form external electrodes electrically connected to internal electrodes.

The dimensions of the multilayer ceramic capacitor produced in the manner described above were 2.0 mm×1.0 mm×1.0 mm. The thickness of the dielectric layer provided between the internal electrodes was 2.5 μm. Further, the number of effective dielectric layers was 230, and a facing electrode area of each layer was $1.7 \times 10^{-6}$ $m^2$.

(C) Characteristics Evaluation

For the multilayer ceramic capacitors obtained under each condition, dielectric constant and dielectric loss were measured. Firstly, electrostatic capacitance and dielectric loss were measured under the condition of AC voltage 1 V, 1 kHz using automatic bridge-type measuring equipment. Then, a dielectric constant was calculated based on an average value of electrostatic capacitance, a thickness of dielectric layer, the number of layers, the facing electrode area.

Next, the high temperature load test was conducted under the condition of 150° C., 7.5 V, and the time with insulating resistance less than or equal to 10 kΩ was determined as a failure, and the mean time to failure (MTTF) of the sample was calculated. The number of samples measured was 10, and an average value was calculated. Further, the number of samples measured was 10 for each of dielectric constant, dielectric loss, and MTTF, and average value thereof was calculated.

Table 6 results of various characteristics evaluations under each condition.

For the fired multilayer ceramic capacitor, Sn/(Ni+Sn) in internal electrodes was substantially the same as the mixture composition, and Sn was present in internal electrodes and was alloyed with Ni, and these facts were confirmed by substantially the same method as Experimental Example 4.

TABLE 6

| Sample No. | Form of Adding Sn Material to Ceramic Material | Sn/(Ni + Sn) | Relative Dielectric Constant | Dielectric Loss (%) | MTTF (time) |
|---|---|---|---|---|---|
| 41* | Ni metal | *** | 4299 | 3.2 | 194 |
| 80 | Ni—Sn alloy | 0.0010 | 4306 | 3.0 | 391 |
| 81 | Ni—Sn alloy | 0.0050 | 4292 | 3.0 | 389 |
| 82 | Ni—Sn alloy | 0.0100 | 4280 | 3.1 | 403 |
| 83 | Ni—Sn alloy | 0.0500 | 4268 | 3.0 | 419 |
| 84 | Ni—Sn alloy | 0.1000 | 4273 | 3.2 | 415 |

Even in the case of using Ni—Sn alloy as metal powder for internal electrode paste, it was confirmed that dielectric characteristics can improve MTTF at the same level.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor, comprising:
a multilayer body including a plurality of laminated dielectric layers and a plurality of internal electrodes arranged along interfaces between the dielectric layers; and
a plurality of external electrodes located on an outer surface of the multilayer body and electrically connected to the internal electrodes; wherein
a thickness of each of the dielectric layers is less than or equal to about 2.5 μm; and
each of the internal electrodes contains Ni as a main component and contains Sn, and a molar ratio of Sn with respect to a sum of Ni and Sn in each of the internal electrodes is greater than or equal to about 0.001 and less than or equal to about 0.1.

2. The multilayer ceramic capacitor according to claim 1, wherein each of the dielectric layers includes, as a main component, a perovskite-type compound containing Ba and Ti, and a portion of Ba can be replaced with Ca, and a portion of Ti can be replaced with Zr.

3. The multilayer ceramic capacitor according to claim 1, wherein the plurality of external electrodes are made of Ag and Cu as main components.

4. The multilayer ceramic capacitor according to claim 1, wherein Sn is in a form of an alloy containing Sn and Ni or an intermetallic compound containing Sn and Ni.

5. The multilayer ceramic capacitor according to claim 1, wherein each of the dielectric layers includes a subcomponent of a rare earth element and/or Mn, Mg and Si.

6. A method for manufacturing a multilayer ceramic capacitor, the method comprising the steps of:
preparing a main component powder including a perovskite-type compound as a main component;
preparing at least one Sn material selected from a group consisting of Sn metal, an alloy containing Sn, and an Sn compound;
obtaining a ceramic green sheet including the prepared main component powder and the prepared Sn material;
obtaining an unfired multilayer body by laminating the ceramic green sheet and internal electrode layers; and
obtaining a multilayer body by firing the unfired multilayer body; and
the multilayer ceramic capacitor including a plurality of dielectric layers and a plurality of internal electrodes formed along interfaces between the dielectric layers; and
each of the internal electrodes contains Ni as a main component and contains Sn, and a molar ratio of Sn and with respect to a sum of Ni and Sn in each of the internal electrodes is greater than or equal to about 0.001 and less than or equal to about 0.1.

7. The method according to claim 6, wherein each of the dielectric layers includes, as a main component, a perovskite-type compound containing Ba and Ti, and a portion of Ba can be replaced with Ca, and a portion of Ti can be replaced with Zr.

8. The method according to claim 6, further comprising forming a plurality of external electrodes on an outer surface of the multilayer body and electrically connected to the internal electrodes, wherein the external electrodes are formed of Ag and Cu as main components.

9. The method according to claim 6, wherein Sn is in a form of an alloy containing Sn and Ni or an intermetallic compound containing Sn and Ni.

10. The method according to claim 6, wherein each of the dielectric layers includes a subcomponent of a rare earth element and/or Mn, Mg and Si.

11. A method for manufacturing a multilayer ceramic capacitor, the method comprising the steps of:
preparing an internal electrode main component powder including, as a main component, Ni metal or an alloy containing Ni;
preparing at least one Sn material selected from a group consisting of Sn metal, an alloy containing Sn, and an Sn compound;
obtaining a ceramic green sheet including a main component powder including a perovskite-type compound as a main component;
obtaining an unfired multilayer body by laminating the ceramic green sheet and an internal electrode including the prepared internal electrode main component powder and the prepared Sn material; and
obtaining a multilayer body by firing the unfired multilayer body; and
the multilayer ceramic capacitor includes a plurality of dielectric layers and a plurality of internal electrodes formed along interfaces between the dielectric layers; and
each of the internal electrodes contains Ni as a main component and contains Sn, and a molar ratio of Sn with respect to a sum of Ni and Sn in each of the internal electrodes is greater than or equal to about 0.001 and less than or equal to about 0.1.

12. The method according to claim 11, wherein each of the dielectric layers includes, as a main component, a perovskite-type compound containing Ba and Ti, and a portion of Ba can be replaced with Ca, and a portion of Ti can be replaced with Zr.

13. The method according to claim 11, further comprising forming a plurality of external electrodes on an outer surface of the multilayer body and electrically connected to the internal electrodes, wherein the external electrodes are formed of Ag and Cu as main components.

14. The method according to claim 11, wherein Sn is in a form of an alloy containing Sn and Ni or an intermetallic compound containing Sn and Ni.

15. The method according to claim 11, wherein each of the dielectric layers includes a subcomponent of a rare earth element and/or Mn, Mg and Si.

16. A method for manufacturing a multilayer ceramic capacitor, the method comprising the steps of:
preparing an internal electrode main component powder including Ni—Sn alloy as a main component;
obtaining a ceramic green sheet including a main component powder including a perovskite-type compound as a main component;
obtaining an unfired multilayer body by laminating the ceramic green sheet and an internal electrode layer containing the prepared internal electrode main component powder; and
obtaining a multilayer body by firing the unfired multilayer body; and
the multilayer ceramic capacitor includes a plurality of dielectric layers and a plurality of internal electrodes formed along interfaces between the dielectric layers; and
the internal electrode contains Ni as a main component and contains Sn, and a molar ratio of Sn with respect to a sum of Ni and Sn in the internal electrode is greater than or equal to about 0.001 and less than or equal to about 0.1.

17. The method according to claim 16, wherein each of the dielectric layers includes, as a main component, a perovskite-type compound containing Ba and Ti, and a portion of Ba can be replaced with Ca, and a portion of Ti can be replaced with Zr.

18. The method according to claim 16, further comprising forming a plurality of external electrodes on an outer surface of the multilayer body and electrically connected to the internal electrodes, wherein the external electrodes are formed of Ag and Cu as main components.

19. The method according to claim 16, wherein Sn is in a form of an alloy containing Sn and Ni or an intermetallic compound containing Sn and Ni.

20. The method according to claim 16, wherein each of the dielectric layers includes a subcomponent of a rare earth element and/or Mn, Mg and Si.

* * * * *